United States Patent [19]

Niwa et al.

[11] Patent Number: 5,182,452
[45] Date of Patent: Jan. 26, 1993

[54] METHOD FOR DETERMINING THE PRESENCE OF THIN INSULATING FILMS

[75] Inventors: Masaaki Niwa, Hirakata; Shozo Okada, Kobe, both of Japan

[73] Assignee: Matsushita Electric Industrial Co. Ltd., Osaka, Japan

[21] Appl. No.: 776,852

[22] Filed: Oct. 15, 1991

Related U.S. Application Data

[63] Continuation of Ser. No. 552,983, Jul. 16, 1990, abandoned.

[30] Foreign Application Priority Data

Jul. 17, 1989 [JP] Japan .................................. 1-184088
Feb. 21, 1990 [JP] Japan .................................. 2-39952

[51] Int. Cl.$^5$ .......................................... H01J 37/00
[52] U.S. Cl. ..................................... 250/307; 250/306
[58] Field of Search .................... 250/306, 307, 423 F; 324/158 R

[56] References Cited

U.S. PATENT DOCUMENTS

| | | | |
|---|---|---|---|
| 4,616,340 | 10/1986 | Hagashi et al. | 357/23.5 |
| 4,902,892 | 2/1990 | Okayama et al. | 250/307 |
| 4,906,840 | 3/1990 | Zdeblick et al. | 250/306 |
| 4,954,704 | 9/1990 | Elings et al. | 250/307 |
| 4,965,865 | 10/1990 | Trenary | 324/158 F |
| 4,988,635 | 1/1991 | Ajika et al. | 357/23.5 |
| 5,015,850 | 5/1991 | Zdeblick et al. | 250/306 |

OTHER PUBLICATIONS

T. Tamaki et al. Preprint of 37th Spring Associated Meeting of Japan Society of Applied Physics (with partial English translation) Lecture No. 30a-Sc-23.

Y. Nakagawa et al. Scanning Tunneling Microscopy of Silicon Surfaces in Air: Observation of Atomic Images T. Vac. Sci. Tech. A, vol. 8(1), Jun./Feb. 1990, pp. 262-265.

R. Williams et al., "Wetting of Thin Layers of SiO$_2$ by Water", Appl. Physics Lttrs., vol. 25, No. 10, Nov. 15, 1974, pp 531-532.

T. Ishigoro et al. Cds Bolometer for Detecting Heat Pulses in a Magnetic Field, Appl. Physics Lttrs., vol. 25, No. 10, Nov. 15, 1974, p. 533.

Primary Examiner—Bruce C. Anderson
Attorney, Agent, or Firm—Ratner & Prestia

[57] ABSTRACT

There is provided a method for determining the presence of an insulating film on the surface of an electrically conductive material. In this method, an electrically conductive probe is brought into contact with the surface of a specimen, and a voltage is applied between the probe and the surface of the specimen. A tunneling current which flows through the probe is detected and amplified, while controlling the distance between the probe and the surface of the specimen to ensure a substantially constant tunneling current.

3 Claims, 15 Drawing Sheets

METHOD FOR DETERMINING THE PRESENCE OF THIN INSULATING FILMS

This application is a continuation of application Ser. No. 07/522,983 filed Jul. 16, 1990, now abandoned.

BACKGROUND OF THE INVENTION

1. Field of the Invention

This invention relates to an analytical technique used in the manufacture of semiconductor devices, and more particularly, it relates to a method for determining the presence of a thin insulating film. The method can be employed in confirming the removal of insulating films formed on electrically conductive materials such as semiconductors and metals.

2. Description of the Prior Art

Hitherto various techniques have been used in determining the presence of any residual insulating film after the removal thereof from the surface of electrically conductive materials.

For example, a method utilizing the water repellency method has often been employed in determining the presence of any residual oxide film after the removal thereof from the surface of silicon by chemical treatment (see, for example, R. Williams et al., Appl. Phys. Lett., Vol. 25, No. 10, 15 Nov. 1974, pp. 531-532).

As shown in FIG. 19, this technique is a simple method by which the thickness d of an oxide film 10 present on the surface of a silicon substrate 8 can be determined by the value of the contact angle $\theta$ between the surface of the oxide film 10 and the line drawn tangent to the surface of a water droplet 27 where it meets the surface of the oxide film 10 on the silicon substrate 8.

FIG. 20 shows the relationship between the value of $\cos \theta$ and the thickness d of the residual oxide film. As can be seen from FIG. 20, it is possible to make a qualitative determination that the residual oxide film 10 is thinner as the water droplet 27 is more easily repelled or as the contact angle $\theta$ is greater. In this way, a rough basis for determination of the presence of oxide films can be readily obtained, therefore, the above-mentioned method has often been used in conjunction with fabrication processes for semiconductor deices.

Beside the water repellency method mentioned above, there have been employed various other methods intended to more closely determine the presence of any residual oxide film on the surface of silicon through instrumental analyses, including Auger electron spectroscopy (AES), secondary ion mass spectrometry (SIMS), energy dispersion type X-ray microanalysis method (EDX), ion scattering spectroscopy (ISS), and X-ray photoelectron spectroscopy (XPS). These techniques for instrumental analyses have already been so advanced as to make possible the quantitative determination of any residual insulating film present on the silicon surface, which can be applied to the analysis with respect to any combination of materials other than the above-mentioned combination of silicon and oxide film. These techniques have therefore been employed when high accuracy is required of such determination.

However, these conventional techniques have the following disadvantages:

(1) The techniques for instrumental analyses, although they permit quantitative analyses with high accuracy, require a vacuum chamber and other large-scale instruments. In addition, a relatively long period of time is required before analysis results can be obtained.

(2) The techniques for instrumental analyses must be used as a destructive analysis technique.

(3) The water repellency method is a nondestructive analysis technique and very simple. However, this method is qualitative and can provide nothing but rough measurements. For example, it is quite difficult to accurately measure the actual value of $\theta$ shown in FIG. 19. In fact, when the water droplet on the silicon substrate 8 is found to be readily repelled, by a visual inspection, it is possible to determine macroscopically that the oxide film has been removed; however, it is impossible to determine microscopically what thickness the residual oxide film 10 has. As seen from FIG. 20, the definite determination as to the presence of any residual oxide film is limited to a thickness of more than 12 Å. Therefore, if device fabrication proceeds to a next step only on the basis of a visual inspection when a very thin oxide film still remains, considerable difficulties may be caused from the standpoint of product reliability.

SUMMARY OF THE INVENTION

The method of this invention for determining the presence of an insulating film on the surface of an electrically conductive material as a specimen, which overcomes the above-discussed and numerous other disadvantages and deficiencies of the prior art, comprises the steps of: bringing an electrically conductive probe into contact with the surface of the specimen; applying a voltage between the probe and the surface of the specimen; and detecting and amplifying a tunneling current which flows through the probe, while controlling the distance between the probe and the surface of the specimen to ensure a substantially constant tunneling current.

In a preferred embodiment, the tunneling current is controlled by the use of a scanning tunneling microscope with a two-dimensional scanning mechanism integrated therein.

In a preferred embodiment, the presence of an insulating film at the interface between the semiconductor substrate and the gate insulator of MOS transistors is determined after removal of the gate insulator, thereby obtaining any specific factor which causes a variation in the threshold voltage of the MOS transistors.

In a preferred embodiment, the presence of an insulating film on the bottom surface of a contact hole which is formed on a dry-etched substrate of semiconductor devices is determined, thereby obtaining any specific factor which causes an increase in the current through the contact hole.

Thus, the invention described herein makes possible the objectives of (1) providing a method for determining the presence of thin insulating films on the surface of electrically conductive materials, which can permit such determination in the nondestructive state with high accuracy and without using any large-scale analytical instrument; (2) providing a method for determining the presence of thin insulating films on the surface of electrically conductive materials, in which a probe is merely brought into contact with the insulating film on the surface of the specimen, so that the measurement in nondestructive state can readily be conducted in the air to detect any residual insulating film with a high accuracy of 15 Å or less in film thickness; (3) providing a method for determining the presence of thin insulating films on the surface of electrically conductive materials such as semiconductors and metals, in which the measurement in the nondestructive state can be conducted in the air with high accuracy by observing a tunneling current through the use of an apparatus having a structure similar to that of a conventional tunneling microscope; (4) providing a method for determining the presence of thin insulating films on the surface of electrically conductive materials, by which the distribution of very thin insulating films can readily be measured in the air by employing a scanning tunneling microscope with a two-dimensional scanning mechanism integrated therein; and (5) providing a method for determining the presence of thin insulating films, which can be applied to various kinds of LSI process evaluation, including cleaning evaluation prior to gate oxidation, analysis of factors for threshold voltage fluctuations in MOS transistors, and dry-etched surface evaluation with respect to contact hole areas, thereby making a significant contribution to the improved reliability in the fabrication of semiconductor devices and in the preparation of semiconductor materials.

BRIEF DESCRIPTION OF THE DRAWINGS

This invention may be better understood and its numerous objectives and advantages will become apparent to those skilled in the art by reference to the accompanying drawings as follows.

DESCRIPTION OF THE PREFERRED EMBODIMENTS

The invention will hereinafter be further illustrated by reference to the following examples.

EXAMPLE 1

Figure 1A:
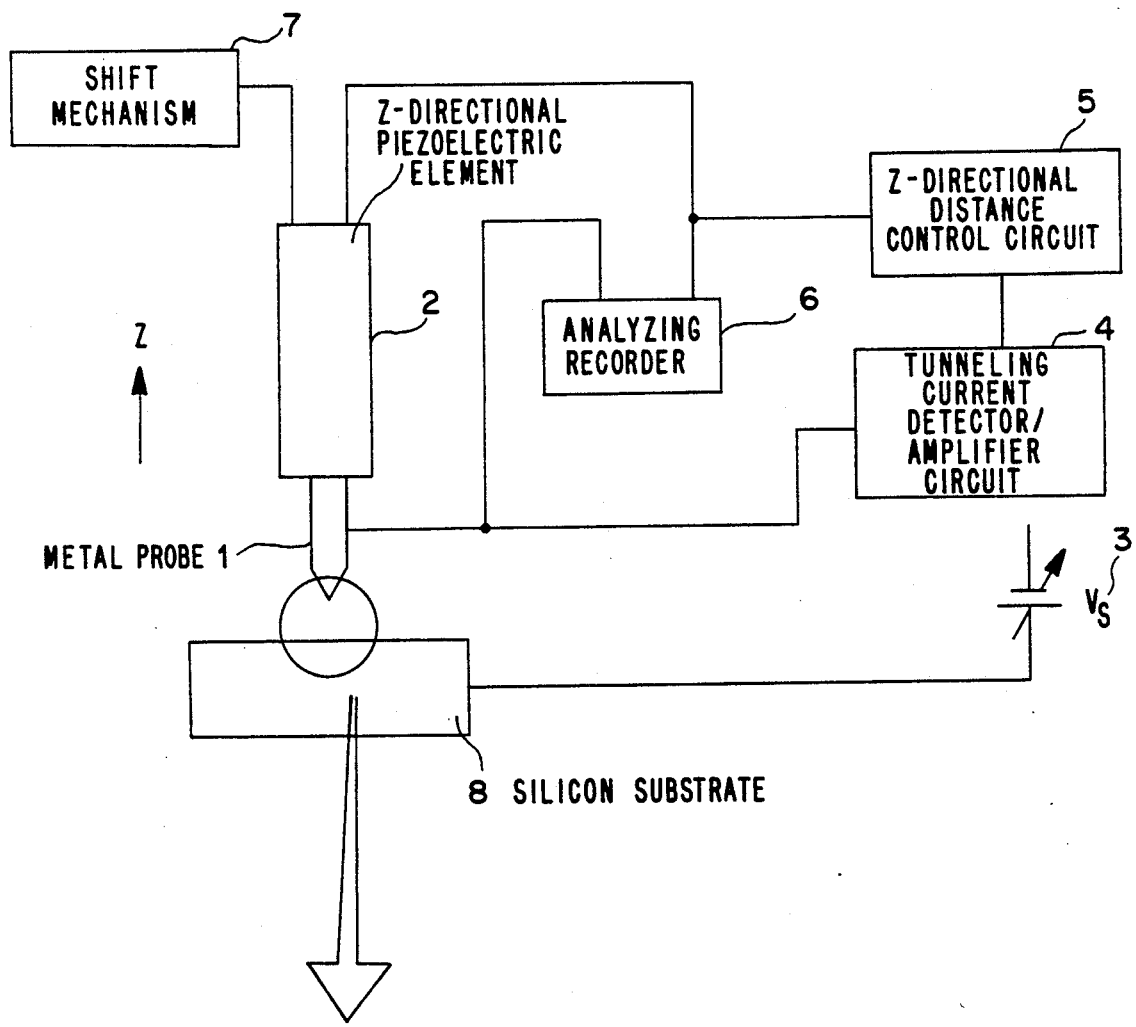
FIG. 1A is a block diagram of a tunneling current measuring apparatus equipped with a tunneling current control mechanism, which is used in the method of this invention.
Figure 1B:
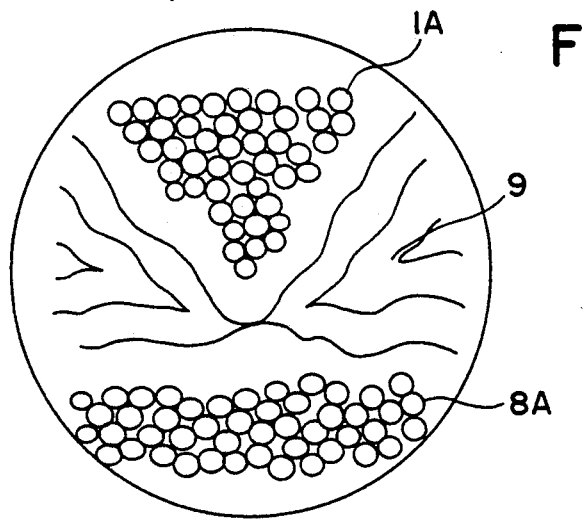
FIG. 1B is an enlarged sectional view showing the tip of the metal probe in the tunneling current measuring apparatus of FIG. 1A.

FIG. 1A shows a tunneling current measuring apparatus equipped with a tunneling current control mechanism, which is used in the method for determining the presence of insulating films according to this invention. When a metal probe 1 mounted to a Z-directional piezoelectric element 2 is moved by a shift mechanism 7 to a proximity of 1 nm distant from the surface of a silicon substrate 8, electron clouds 9 smearing out around the respective surface atoms 1A and 8A of the metal probe 1 and silicon substrate 8 are connected together, as shown in FIG. 1B.

In this condition, a slight voltage ($V_s$) 3 is applied between the metal probe 1 and the silicon substrate 8, whereupon a tunneling current It flows therebetween. The tunneling current $I_t$ is detected and amplified by a tunneling current detector/amplifier circuit 4, and the $I_t$ value is then fed back by a Z-directional distance control circuit 5 so as to be stabilized to the predetermined constant value. The distance between the metal probe 1 and the surface of the silicon substrate 8 as a specimen is thus controlled.

As a result, the Z-directional piezo-electric element 2 is caused to expand or contract until the predetermined $I_t$ value is obtained, and the dependence on time of the displacement thereof is recorded, together with the $I_t$ value, by an analyzing recorder 6.

Figure 2:
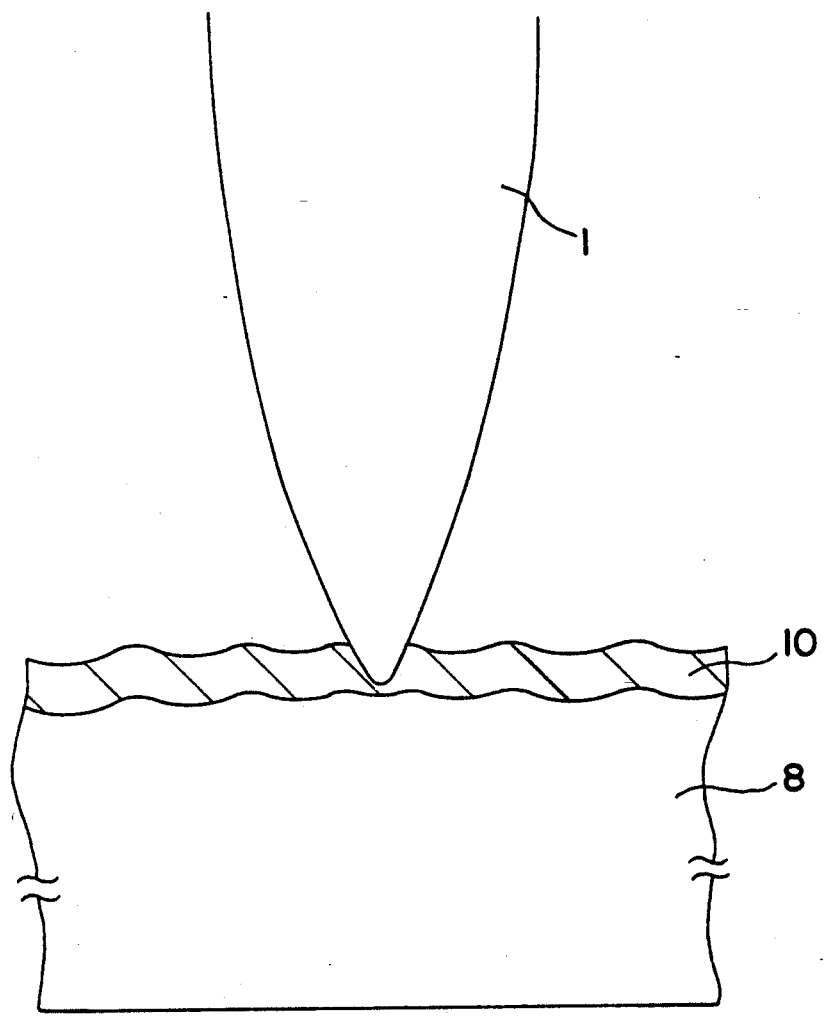
FIG. 2 is a sectional view showing the metal probe and the surface portion of the silicon substrate of FIG. 1A in cases where an oxide film is present on the surface of the silicon substrate.

In the above described process, when the metal probe 1 moves toward the silicon substrate 8 in order to obtain the predetermined $I_t$ value and if an oxide film 10 is present on the uppermost surface of the silicon substrate 8, the metal probe 1 and the oxide film 10 come into contact with each other, as shown in FIG. 2.

The metal probe 1 brought into contact with the oxide film 10 will cause some disorder in the arrangement of atoms on its uppermost surface and the point at which tunneling of electrons can occur will vary according to the atomic arrangement. Accordingly, feedback is from time to time applied for controlling the $I_t$ value resulting from the tunneling from the new point, but the dependence on time of the tunneling current observed becomes unstable as compared with the case in which the metal probe 1 is in a noncontact state. In cases where the metal probe 1 is under two-dimensional scanning, the instability mentioned above will be further increased.

The table given below shows the relationship between the tunneling current $I_t$ and the amplitude of an image obtained by use of an scanning tunneling microscope (STM). In cases where the amplitude of the tunneling current is large, that is, the dependence on time of the $I_t$ value is unstable, the STM image obtained does not reflect the actual surface irregularities of the specimen and it only becomes a pseudo-STM image resulting from noise.

On the other hand, in cases where the amplitude is small, that is, the dependence on time of the $I_t$ value is stable, the STM image obtained reflects the actual surface irregularities of the specimen. Even when the amplitude of the STM image is large, STM signals generated can be interpreted as representing an image reflecting the actual surface irregularities of the specimen, if the $I_t$ value is stable.

TABLE

| Amplitude of STM image | Amplitude of Tunneling Current $I_t$ | |
|---|---|---|
| | Large | Small |
| Large | x | o |
| Small | x | o |

In the table, "o" denotes that no insulating film is present on the surface of the specimen (i.e., such a film, if any, is not within the detection limits) and that STM signals obtained represent as STM image reflecting the actual surface irregularities of the specimen; and "x" denotes that an insulating film is present on the surface of the specimen (i.e., beyond the upper detection limit) and that STM signals obtained do not represent an STM image reflecting the actual surface irregularities of the specimen, but it represents a pseudo-STM image resulting from noise.

Figure 3A:
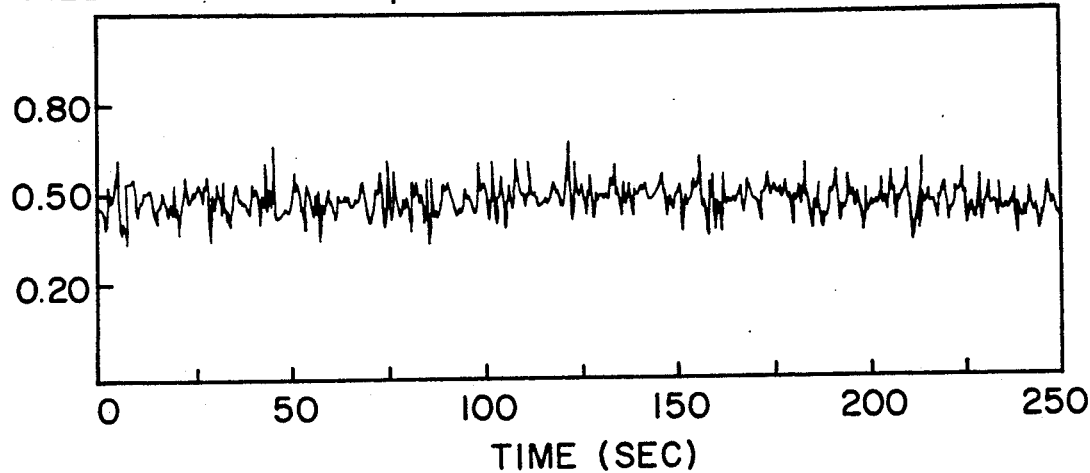
FIGS. 3A and 3B are charts showing the time dependence of tunneling currents on the surface of the silicon substrate, as obtained by the apparatus of FIG. 1A.
Figure 3B:
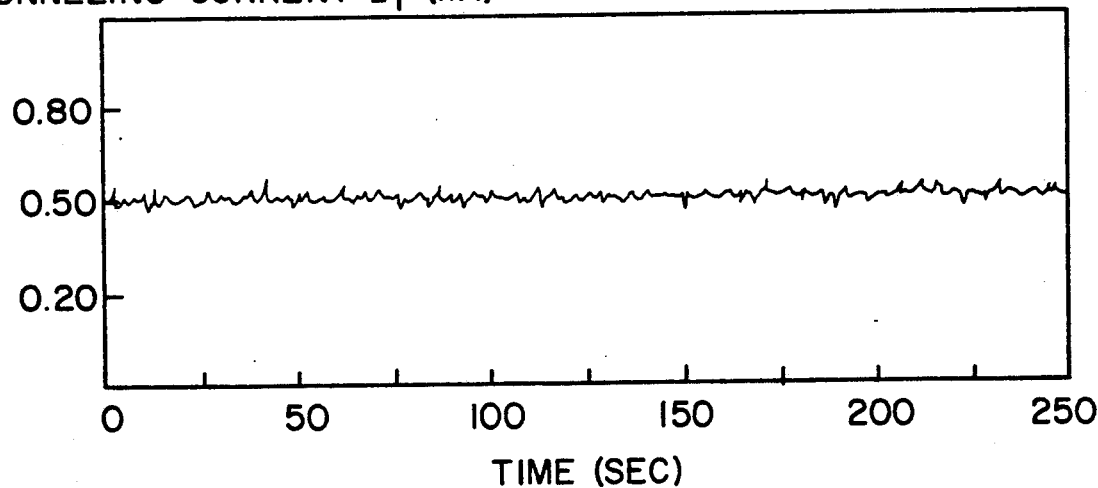

FIGS. 3A and 3B show the variations in tunneling current obtained in cases where the applied voltage $V_s$ is 0.5 V and the predetermined tunneling current value is 0.50 nA. FIG. 3A show an example of measurements with respect to the specimens in which an oxide film with a thickness of about 12 Å is present, wherein the $I_t$ values are in a disorderly state. FIG. 3B shows an example of measurements with respect to the specimens in which the thickness of oxide film present, if any, was determined to be lower than the lower detection limit by other analysis means, wherein the $I_t$ values are found to be stable. These specimens were all determined to be water repellent by the water repellency method which leads to a judgment that no oxide film is present. This fact shows that the presence of oxide films can be determined with high accuracy by the method of this invention using the tunneling current measuring apparatus.

EXAMPLE 2

Figure 4:
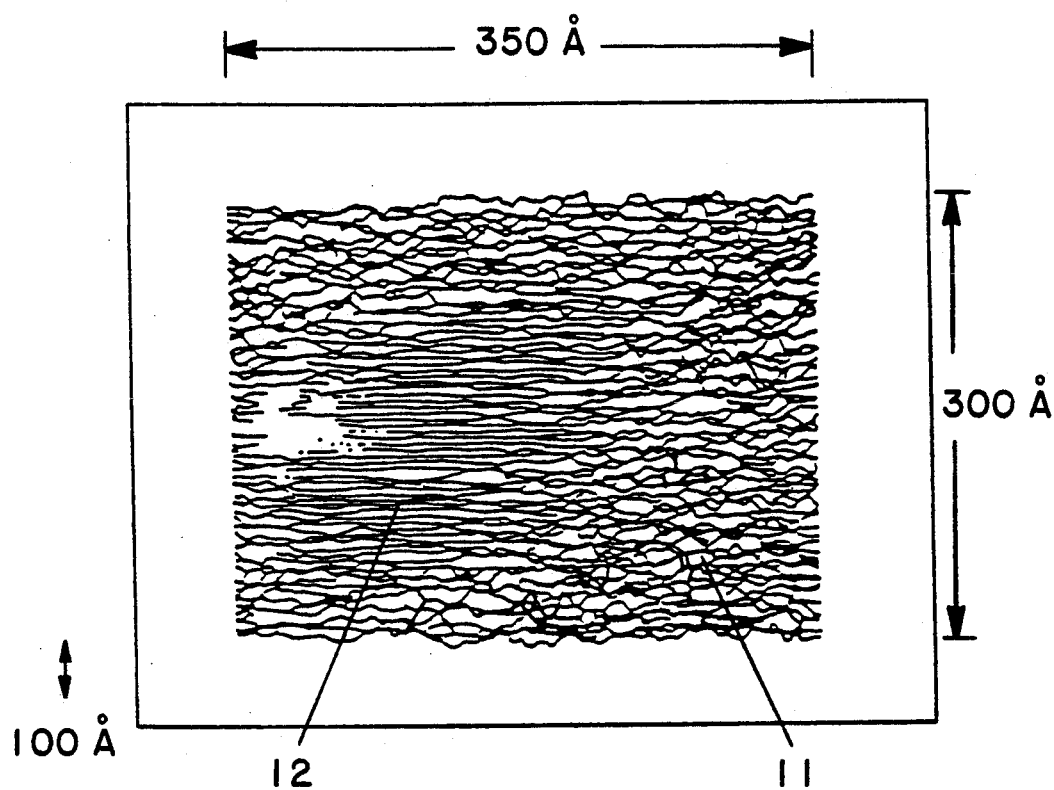
FIG. 4 is a view showing a scanning tunneling microscope (STM) image obtained by the apparatus of FIG. 5A, with respect to the surface of the silicon substrate.

FIG. 4 shows an STM image obtained from the surface of a silicon substrate which had been treated with a hydrofluoric acid to remove an oxide film formed on the surface and had been then allowed to stand in air for a while. The removal of the oxide film was confirmed by the water repellency method. The STM image can be obtained in the following manner.

Figure 5A:
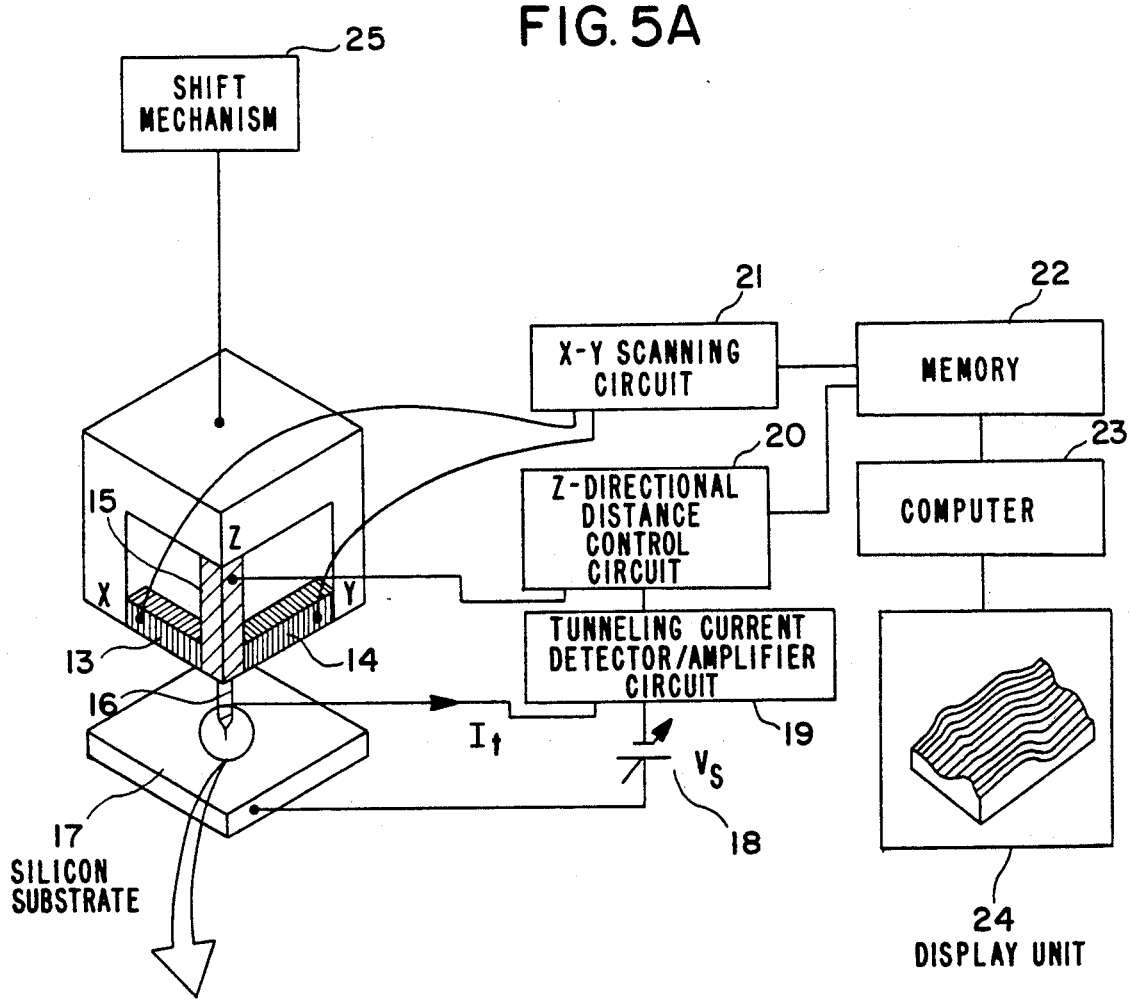
FIG. 5A is a block diagram of another tunneling current measuring apparatus which is used in the method of this invention.
Figure 5B:
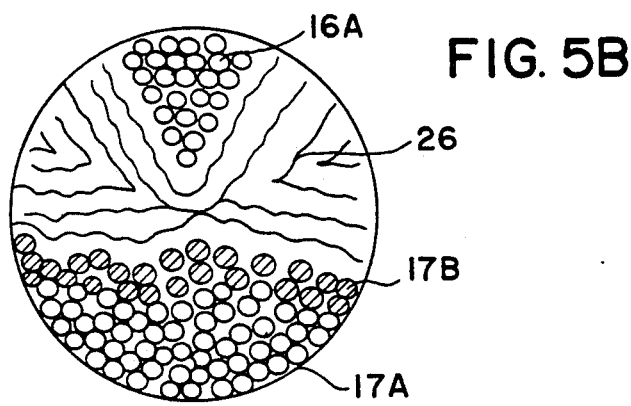
FIG. 5B is an enlarged sectional view showing the tip of the metal probe in the tunneling current measuring apparatus of FIG. 5A.

FIG. 5A shows another tunneling current measuring apparatus equipped with a tunneling current control mechanism, which is used in the method for determining the presence of insulating films according to this invention. When a metal probe 16 mounted to an end of three-dimensional actuator having piezo-elements 13, 14, and 15 in X, Y, and Z directions, respectively, as shown in FIG. 5A is moved by a shift mechanism 25 to a proximity of 1 nm distant from the surface of a silicon substrate 17 as a specimen, electron clouds 26 smearing out around the respective surface atoms 16A and 17A of the probe 16 and substrate 17 are connected together, as shown in FIG. 5B. In this state, a slight voltage ($V_s$) 18 is applied between the metal probe 16 and the silicon substrate 17, whereupon a tunneling current $I_t$ flows therebetween. The tunneling current is detected and amplified by a tunneling current detector/amplifier circuit 19, and the $I_t$ is then fed back by a Z-directional distance control circuit 20 so as to be stabilized to the predetermined constant value. Thus, the distance between the metal probe and the surface of the specimen is controlled.

As a result, the Z-directional piezo-electric element 15 is caused to expand and contract until the predetermined $I_t$ value is obtained, and the displacement of the Z-directional piezo-element and the respective displacements of the X- and Y-directional piezoelements as controlled by an X-Y scanning circuit 21 are stored in a memory 22. Thus, information on microscopic irregularities of the specimen surface is amplified by a computer 23 and then displayed on a display unit 24, thereby obtaining an image in the two-dimensional real space, which is referred to as an STM image.

The STM image shown in FIG. 4 was obtained in cases where the voltage $V_s$ applied to the specimen is 0.2 V and the predetermined tunneling current $I_t$ is 1 nA. The time dependence of the $I_t$ value was found to be stable in a portion corresponding to a flat region 12, whereas in a portion corresponding to a peripheral irregular region, the time dependence was generally found to be unstable.

The flat region 12 in FIG. 4 is the same as the surface topology observed immediately after treatment with a hydrofluoric acid. In the flat region 12, the surface of the silicon substrate 17 exposed is considered to be very flat.

The peripheral irregular region 11 is a region in which the surface of the silicon substrate 17 has been subjected to spontaneous oxidation by being allowed to stand in air. In this region 11, the metal probe 16 moves toward the surface of the silicon substrate 17 so that the predetermined tunneling current value of 1 nA is obtained, and comes in contact with a very thin oxide film 17B present between the metal probe 16 and the silicon substrate 17, which is considered to have a thickness of about 12 Å or more. Because the metal probe 16 enters into the very thin oxide film 17B, the surface topology of the silicon substrate 17 appears to be in some disorderly state.

In this case, when the surface of the silicon substrate 17 is inspected in accordance with the water repellency method, the surface is very capable of repelling water droplets, and it can be determined that no oxide film is present on the surface. When the silicon substrate 17 is further allowed to stand for a long time, the entire surface of the silicon substrate 17 can be observed as having an irregular topology, indicating that it has been completely re-oxidized. All of these behaviors were confirmed by other analysis means such as XPS.

As stated above, with the use of the STM means, it was possible to readily determine the presence of oxide films on the silicon substrate with high accuracy and yet in a nondestructive manner in the air.

EXAMPLE 3

Figure 6A:
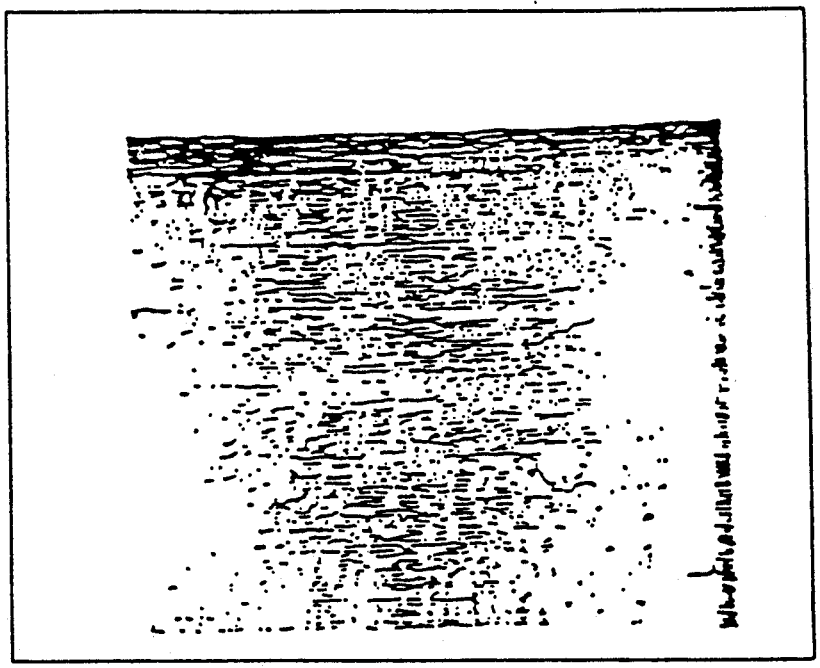
FIG. 6A is a view showing an STM image obtained by the apparatus of FIG. 5A, with respect to the surface of the silicon substrate which was subjected to conventional washing treatment.

FIG. 6A shows an STM image of the surface of a silicon substrate obtained after being subjected to a conventional washing treatment, which is an STM image representing an irregular surface image obtained according to the principle described in Example 2.

Figure 6B:
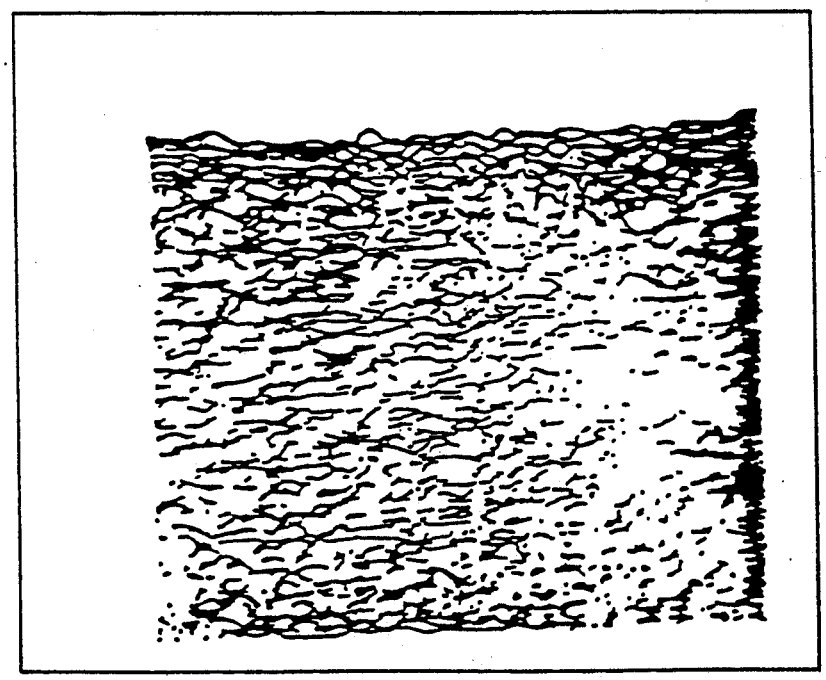
FIG. 6B is a view showing an STM image obtained by the apparatus of FIG. 5A, with respect to the surface of the silicon substrate which was subjected to conventional washing treatment and then to heat treatment in the atmosphere of nitrogen.

FIG. 6B shows an STM image of the surface which, after the above-mentioned washing treatment, was subjected to a heat treatment in the atmosphere of high-purity nitrogen. The heat treatment was carried out by inserting the silicon substrate into a quartz tube kept in the atmosphere of dry nitrogen at 800° C., holding in such atmosphere for 2 hours at 900° C., and then lowering the temperature to 800° C. before the silicon substrate is taken out. During the heat treatment, the silicon substrate was kept in the atmosphere of high-purity nitrogen at all times under high temperature conditions except when kept in room temperature, whereby it was prevented from being exposed to the air.

The comparison between FIGS. 6A and 6B shows that the surface of the silicon substrate seems to become roughened by heat treatment.

Figure 7A:
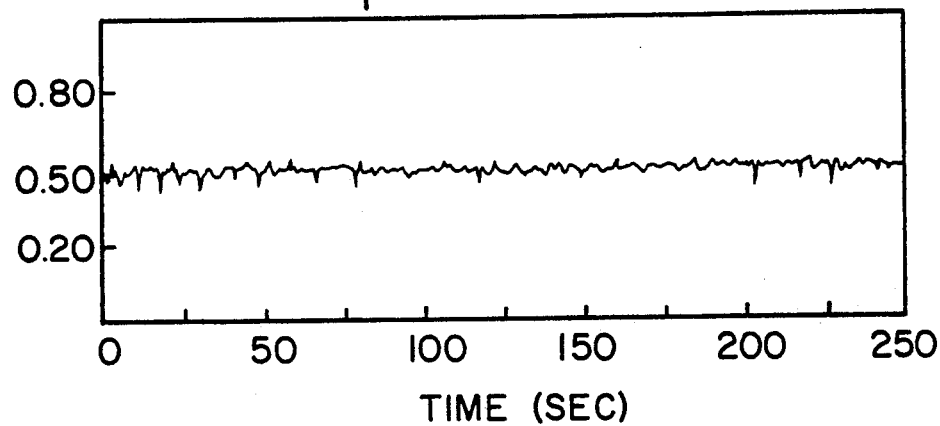
FIGS. 7A and 7B are charts showing the time dependence of tunneling currents on the surface of the silicon substrates, as obtained during the measurements of the STM images in FIGS. 6A and 6B, respectively.
Figure 7B:
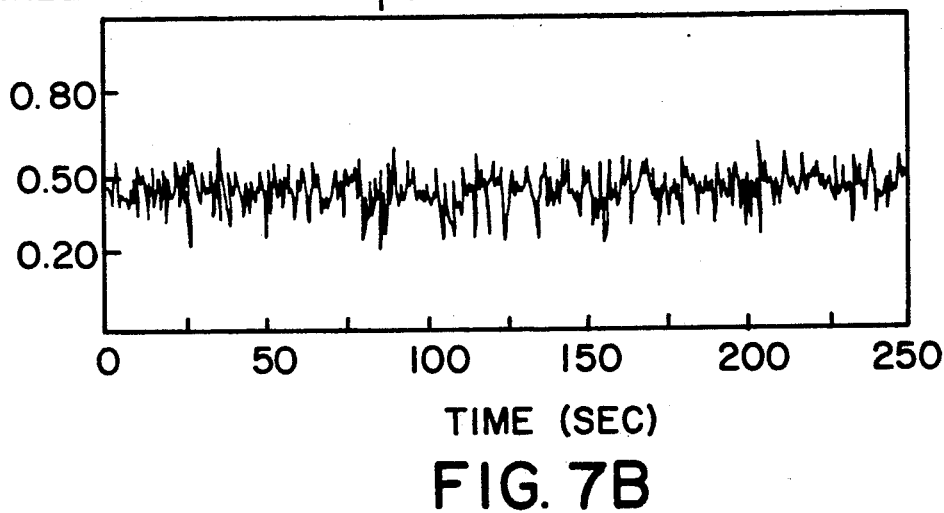

FIG. 7A shows time variations in the tunneling current $I_t$ when the measurements as shown in FIG. 6A were made. FIG. 7B shows time variations in the tunneling current $I_t$ when the measurements were made.

By comparing FIGS. 7A and 7B, it is clear that the tunneling current $I_t$ on the silicon surface subjected to the conventional washing treatment only was stable and kept constant, as shown in FIG. 7A, whereas the tunneling current $I_t$ obtained in cases where the surface of the silicon substrate after the washing thereof was subjected to heat treatment at the atmosphere of nitrogen, was made considerably irregular, as shown in FIG. 7B. From this fact, it is considered that the STM image of the silicon surface subjected to the conventional washing treatment (see FIG. 6A) represents a surface topology reflecting the actual microscopic irregularities of the surface, indicating in atomic terms that the silicon substrate has a flat surface.

On the other hand, the STM image of the surface which was subjected to heat treatment in the atmosphere of high-purity nitrogen after the washing treatment (see FIG. 6B) does not represent a surface topology reflecting the actual microscopic irregularities of the surface, but it indicates that, for the lating film is present on the surface of the silicon substrate. This very thin insulating film is presumed to be a nitride produced through the heat treatment in the atmosphere of nitrogen.

Figure 8:
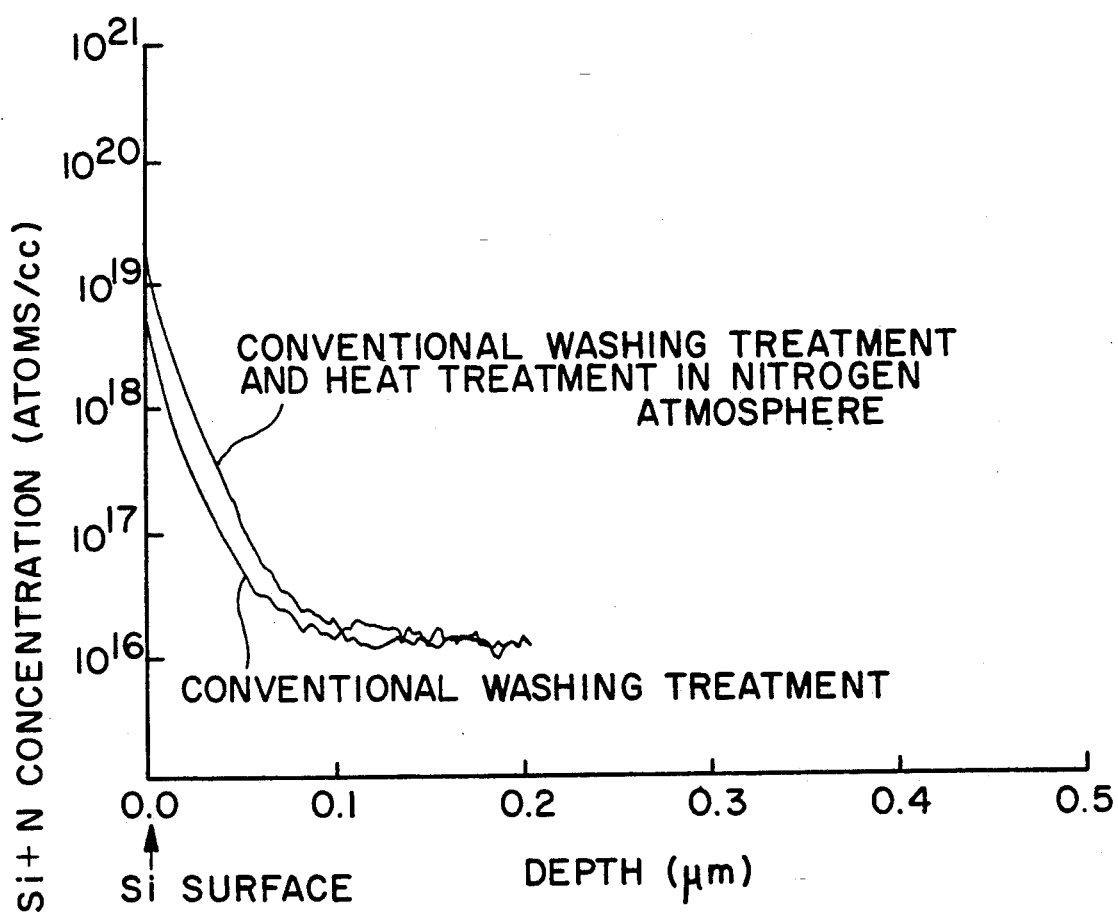
FIG. 8 is a graph showing the distribution of silicon and nitrogen atoms in the direction of depth from the surface of the silicon substrate, as measured by secondary ion mass spectrometry.

FIG. 8 shows the distribution of Si and N atoms in the direction of depth, which was obtained by secondary ion mass spectrometry (SIMS) for the purpose of identifying the product. From this figure, it is found that the presence of nitrogen was detected in greater amounts on the top surface of the silicon substrate which was subjected to heat treatment in the atmosphere of nitrogen, than on the surface of the silicon substrate which was not heat treated. The amount of nitrogen present on the top surface was also found to be about three times as much in terms of dosage as that present on the latter surface.

Figure 9A:
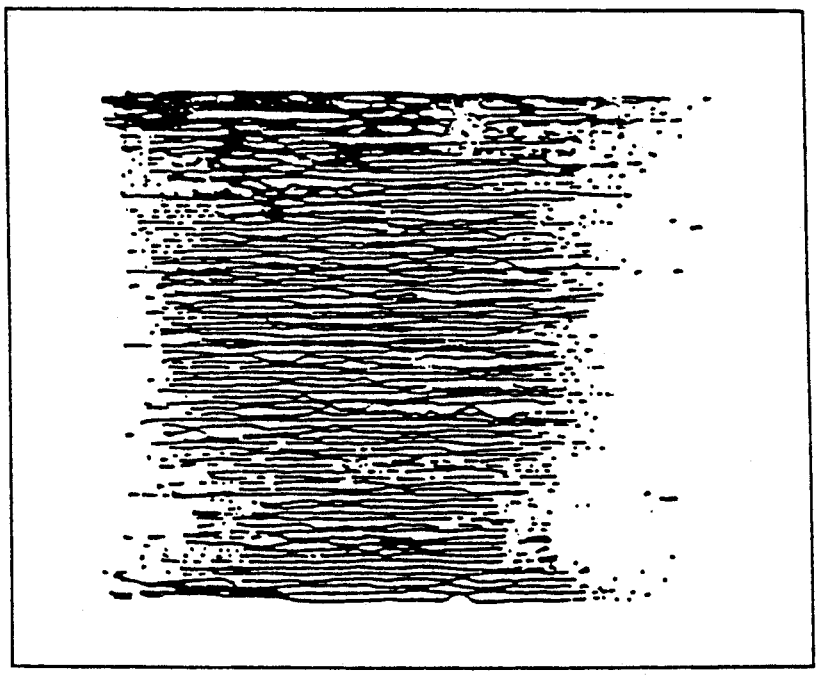
FIG. 9A is a view showing an STM image obtained by the apparatus of FIG. 5A, with respect to the surface of the silicon substrate in FIG. 6A which was further etched with hot phosphoric acid.
Figure 9B:
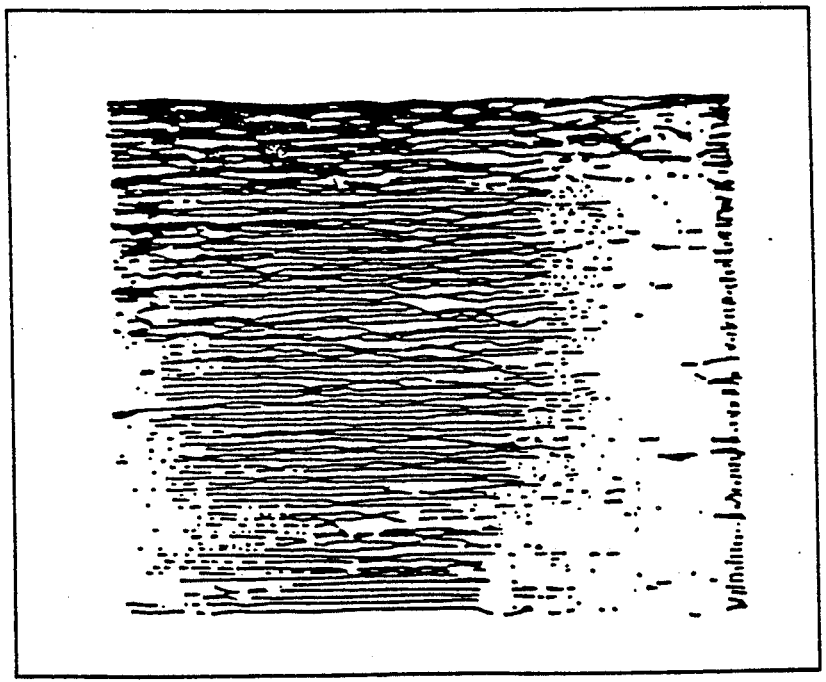
FIG. 9B is a view showing an STM image obtained by the apparatus of FIG. 5A, with respect to the surface of the silicon substrate in FIG. 6B which was further etched with hot phosphoric acid.
Figure 10A:
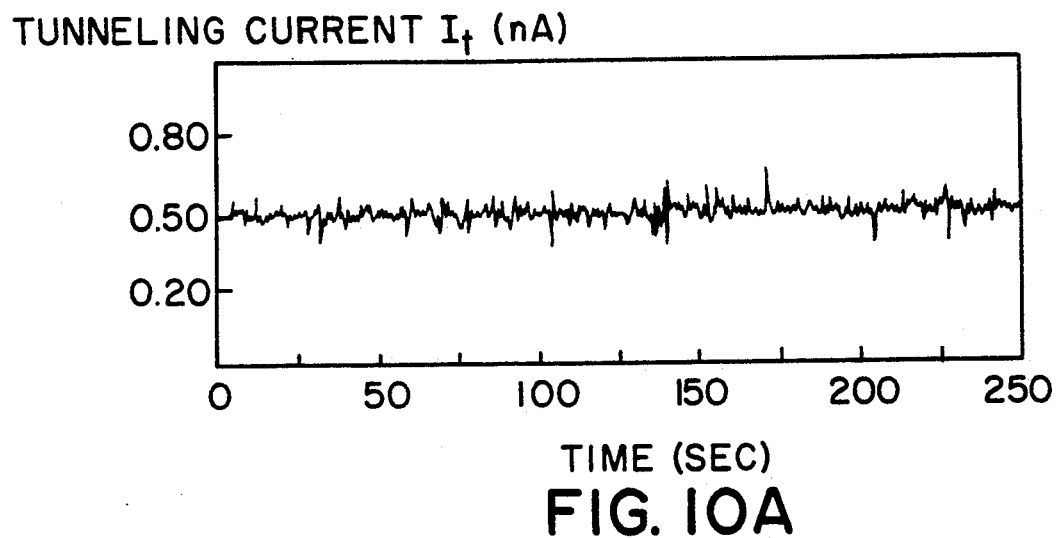
FIGS. 10A and 10B are charts showing the time dependence of tunneling currents on the surface of the silicon substrates, as obtained during the measurements of the STM images in FIGS. 9A and 9B, respectively.
Figure 10B:
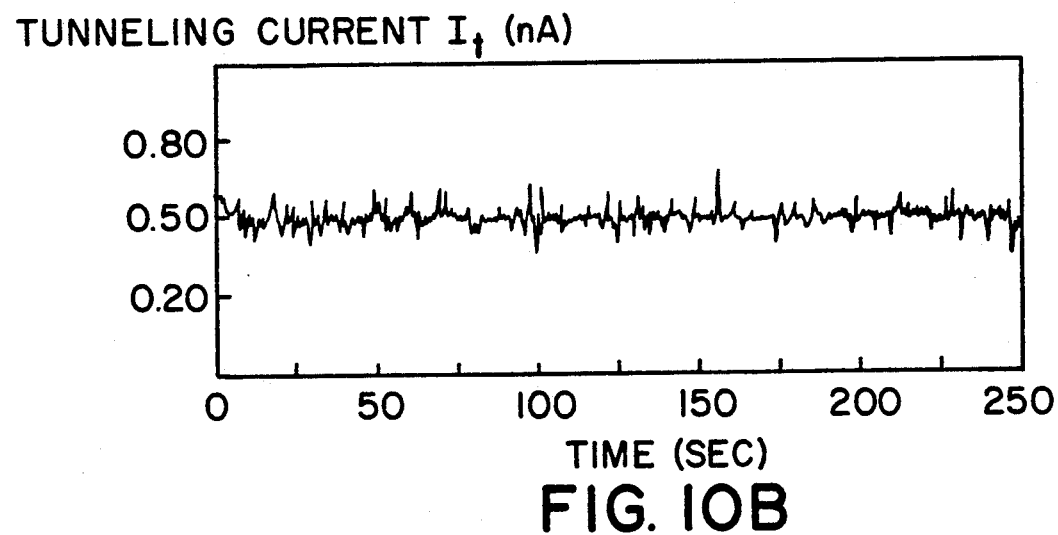

FIGS. 9A and 9B show STM images of the specimens mentioned above with reference to FIGS. 6A and 6B, respectively, as obtained after these specimens were treated with hot phosphoric acid and then with hydrofluoric acid. Moreover, FIGS. 10A and 10B show the time dependences of tunneling current $I_t$ with respect to the specimens, which correspond to the respective surfaces of the specimens shown in FIGS. 9A and 9B. As can be seen from FIGS. 10A and 10B, the respective behaviors of the tunneling currents $I_t$ in the two specimens were almost equally stable. Accordingly, the topologies shown in FIGS. 9A and 9B, which are apparently very similar, reflect the microscopic irregularities of the actual surfaces, and the surfaces of these specimens are equally flat. From the above observations it is clear that the very thin insulating film shown in FIG. 6B was silicon nitride which was removed by hot phosphoric acid.

Thus, in this example, it was found by the use of the STM means that a very thin insulating nitride film was present on the top surface of the silicon substrate which was treated in the atmosphere of nitrogen prior to the formation of a gate oxide film.

EXAMPLE 4

In order to develop various large-scale integrated circuits (LSIs), it is essential to obtain the desired transistor characteristics with a high reproducibility and uniformly within the silicon substrate. For example, the threshold voltage (hereinafter referred to as $V_{th}$) of the transistor may fluctuate depending upon the treatment conducted prior to and/or after the formation of a gate oxide film. The threshold voltage $V_{th}$ is defined as a gate voltage for the formation of an inversion layer on the semiconductor surface of an MOS diode. In the foregoing Example 3, a very thin nitride film was intentionally formed, while $V_{th}$ fluctuations in actual devices will be discussed in this example.

Figure 11:
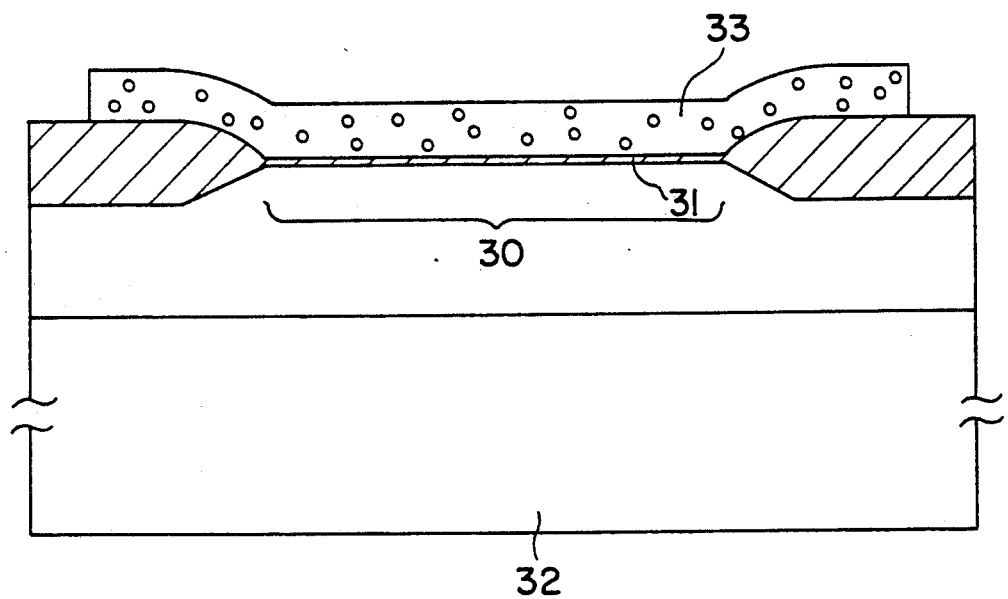
FIG. 11 is a sectional view showing an actual device structure of the gate electrode portion of a metal-oxide-semiconductor large-scale integrated circuit (MOS LSI).

FIG. 11 shows an actual device arrangement of a gate electrode area of N-channel MOS-LSIs using a p-type silicon substrate. A gate oxide film 31 in a local oxidation (LOCOS) active region 30 is formed on a silicon substrate 32 by thermal oxidation after surface cleaning steps such as etching and sacrificial oxidation. Subsequently, a gate electrode 33 made of polysilicon (hereinafter referred to as polysilicon gate electrode) is formed by chemical vapor deposition or the like, followed by heat treatment and other steps.

Figure 12:
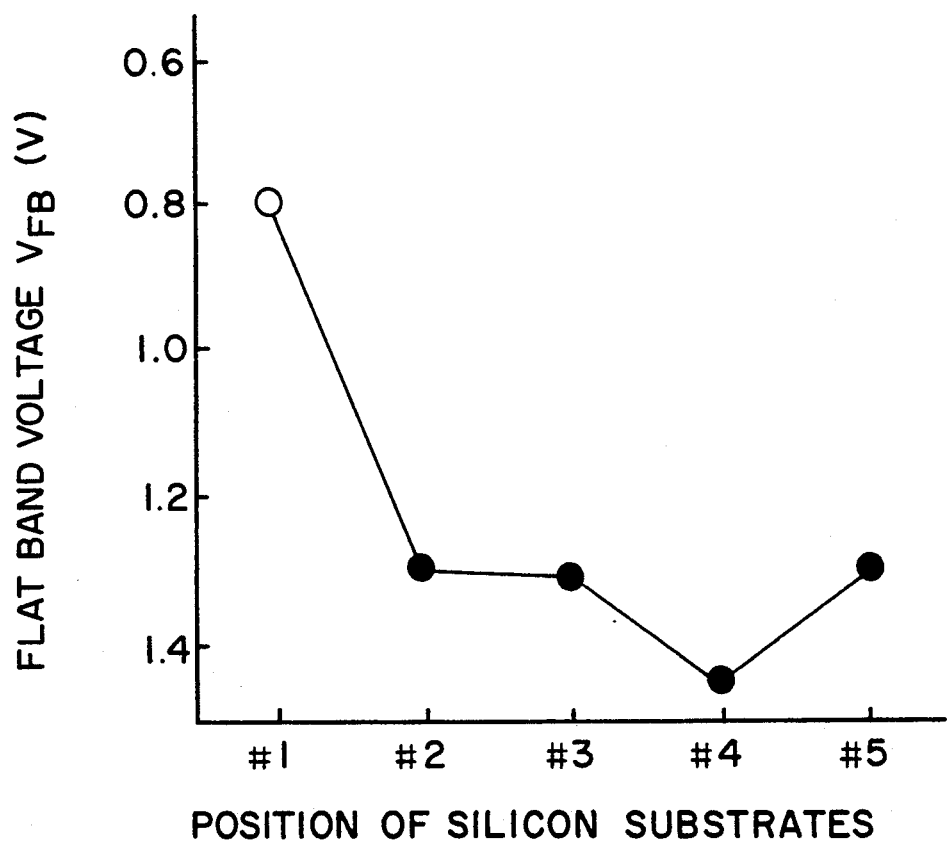
FIG. 12 is a graph showing the relationship between the flat band voltage and the position of silicon substrates during heat treatment.

FIG. 12 shows the fluctuation characteristics in flat band voltage $V_{FB}$ as measured according to the C-V characteristics of an actual device structure. In FIG. 12, the ordinate axis represents $V_{FB}$; "o" represents normal values; "∘" represents abnormal values; and the abscissa axis represents silicon substrate numbers in which order individual substrates were loaded into a furnace for heat treatment.

The individual substrates exhibited good reproducibility in their $V_{FB}$ fluctuation characteristics in corresponding relation to their $V_{th}$ fluctuations. Indeed, as shown in FIG. 12, individual substrates exhibited differences in their characteristics despite the fact that these substrates were treated in the same time. It was noticed that the differences were due to the manner in which the substrates were arranged in the steps for heat treatment including gate oxidation.

Figure 13:
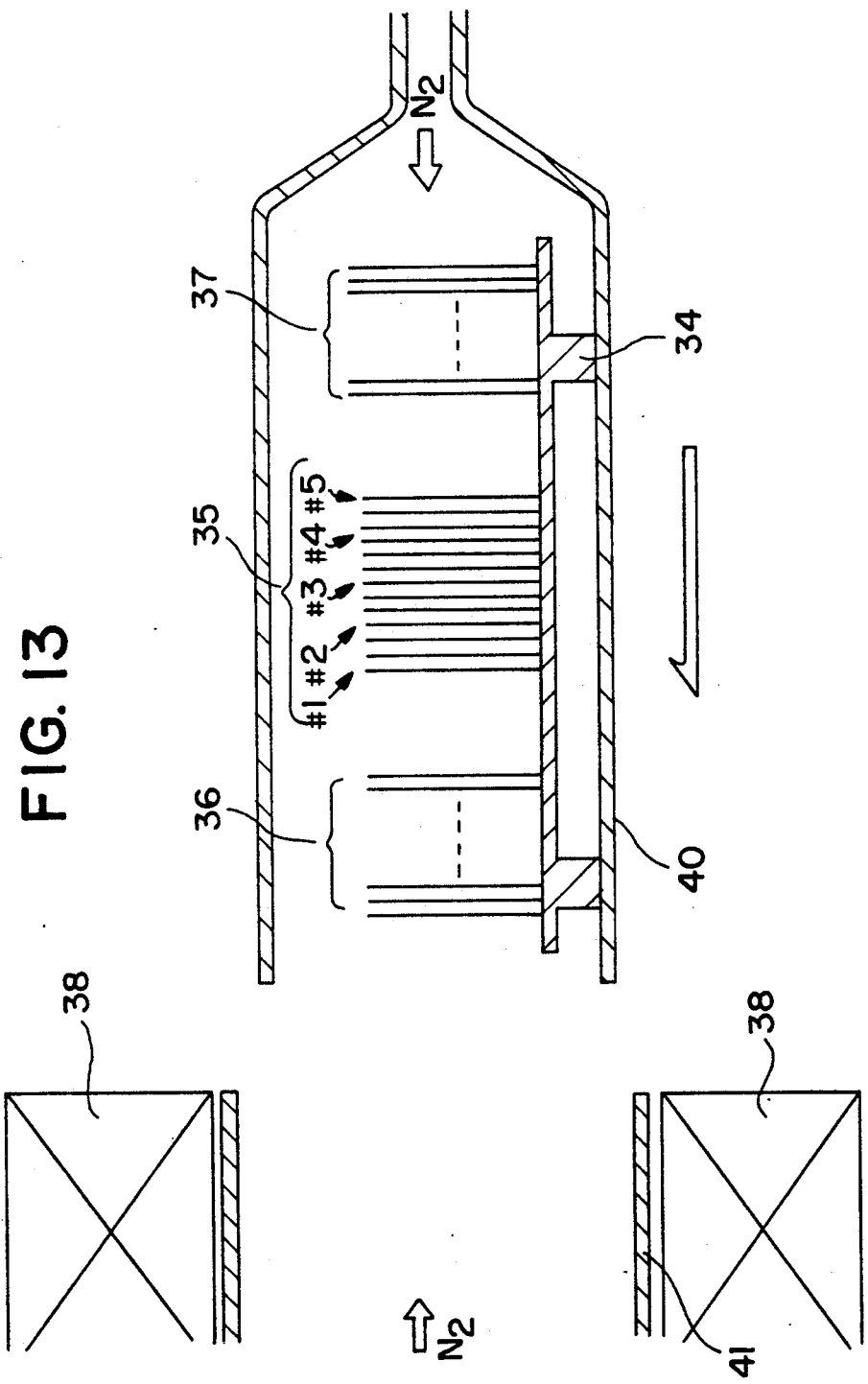
FIG. 13 is a schematic sectional view showing the arrangement of silicon substrates during heat treatment.

FIG. 13 shows the arrangement of the silicon substrates within an inner quartz tube in the above-mentioned step of heat treatment. As shown in this figure, thirteen substrates of an actual lot 35 were placed on a substrate supporting base 34 in order of their numbers with their respective surfaces oriented toward a furnace 38, while a set of thirteen dummy substrates 36 and 37 are arranged, respectively, before and behind of the actual lot 35. Then, the inner quartz tube 40 is inserted into a core tube 41 (i.e., outer quartz tube) of the furnace 38, while high-purity nitrogen gas is allowed to flow in the direction of the arrow from the rear of the inner quartz tube 40. In this case, high-purity nitrogen gas is also allowed to flow from the rear of the electric oven 38 to the front of the inner quartz tube 40.

Figure 14:
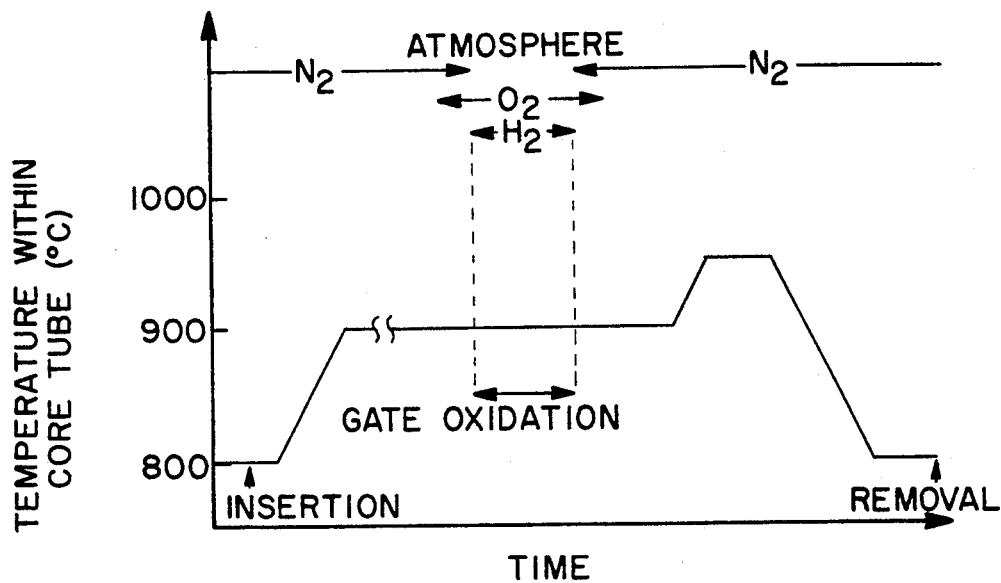
FIG. 14 is a diagram showing the temperature profile during the formation of a gate oxide film.

FIG. 14 shows the schematic temperature profile during the formation of the gate oxide film 31. At the time when the temperature within the core tube 41 is 800° C., the inner quartz tube 40 is inserted into the core tube 41. After the temperature within the core tube 41 is again stabilized at 800° C., the core tube 41 is further heated to 900° C. After the temperature is well stabilized, the atmosphere in the inner quartz tube 40 is changed over from nitrogen gas to a mixed gas of oxygen and hydrogen, followed by the formation of the gate oxide film 31.

Thereafter, the atmosphere in the inner quartz tube 40 is again changed over to nitrogen gas, and the temperature is raised to 950° C. for improvement of the film quality. The core tube 41 is cooled down to 800° C., and after the temperature within the inner quartz tube 40 is stabilized, the inner quartz tube 40 is removed from the core tube 41.

The gate oxide film 31 formed as mentioned above, was a wet oxide film with a thickness of 200 Å. The process which causes $V_{th}$ fluctuations is considered to be associated with the probabilities of gas fly according to the arrangement of the individual substrates.

In the case of a p-type semiconductor, the surface potential of silicon is $\phi_S = 2\phi_f$ during the formation of an inversion layer, and the threshold voltage $V_{th}$ is expressed by the following equation:

$$V_{th} = 2\phi_f + V_{FB} + [2\epsilon_r \epsilon_0 q N_a (2\phi_f)]^{\frac{1}{2}} \cdot C_0^{-1}$$

where $\phi_f$ is the Fermi potential; $V_{FB}$ is the flat band voltage; $\epsilon_r$ is the relative permittivity of silicon; $\epsilon_0$ is the permittivity in vacuum; q is the magnitude of electronic charge; $N_a$ is the density of ionized acceptors; and $C_O$ is the fixed capacitance of the gate oxide film.

In the above equation, the first term represents a component corresponding to the inversion layer, and the third term represents a component corresponding to the depletion layer, both of which can be automatically determined when the kind and conductivity type of the semiconductor are determined. However, the second term is the flat band voltage $V_{FB}$ which depends delicately on the process of forming the gate electrode, so that the operation of MOS transistors can be made very unstable because the MOS diode may not be inverted in some cases even when the flat band voltage $V_{FB}$ is applied to the gate electrode. The flat band voltage $V_{FB}$ is expressed by the following equation:

$$V_{FB} = V_{MS} - Q_{SS}/C_O + V_C$$

where $V_{MS}$ is the work function difference between the gate electrode and the semiconductor, that is, contact potential difference; $Q_{SS}$ is the fixed surface level charge; and $V_C$ is the negative gate voltage required to compensate the potential effect of cations present in the oxide film.

In the above equation, the first term is automatically determined when the kind and conductivity type of the semiconductor is determined. The second and third terms are those which are delicately associated with the process of forming the gate electrode, wherein $Q_{SS}$ does not depend on the conductivity type and resistivity of the silicon substrate, nor on the thickness of the oxide film, but it depends greatly on the conditions of oxidation and/or heat treatment because it is attributable to the presence of excess silicon atoms localized at the interface between the oxide film and the silicon substrate. The factor $V_C$ may be attributable to the trapping caused by movable ions, such as sodium ions, in the oxide film, radiation damages, or the like. In cases where any impurity film is present in the surface portion of the silicon substrate 32 just below the gate electrode 33, the second and third terms (in particular, $Q_{SS}$) of the above equation fluctuate and accordingly $V_{FB}$ fluctuates, which in turn cause $V_{th}$ fluctuations.

However, in various cases where such fluctuations are actually encountered, as described in this example, any insulating impurity film is not intentionally formed as in the foregoing Example 3; therefore, in secondary ion mass spectrometry (hereinafter referred to as SIMS), the presence of such an impurity film is below the lower detection limit. It has hitherto measurement of factors for $V_{th}$ fluctuations, and therefore, the causes of such fluctuations are, as yet unknown.

As specimens for STM measurements, small cut pieces of the substrates Nos. 1 and 5 shown in FIG. 12 were used. The gate electrode 33 made of polysilicon was removed with a heated aqueous solution of potassium hydroxide, and then the gate oxide film 31 was removed with an aqueous solution of hydrofluoric acid, whereby the surface of the silicon substrate 32 was exposed.

For the purpose of carrying out the STM measurements, the surface of the silicon substrate 32 was fixed to a STM sample holder. Measurements were made of the cut pieces under the following conditions: the predetermined tunneling current $I_t$ is 0.50 nA, the applied voltage $V_s$ is 1.78 V, and the scan area S is 8000 Å$^2$.

Figure 15:
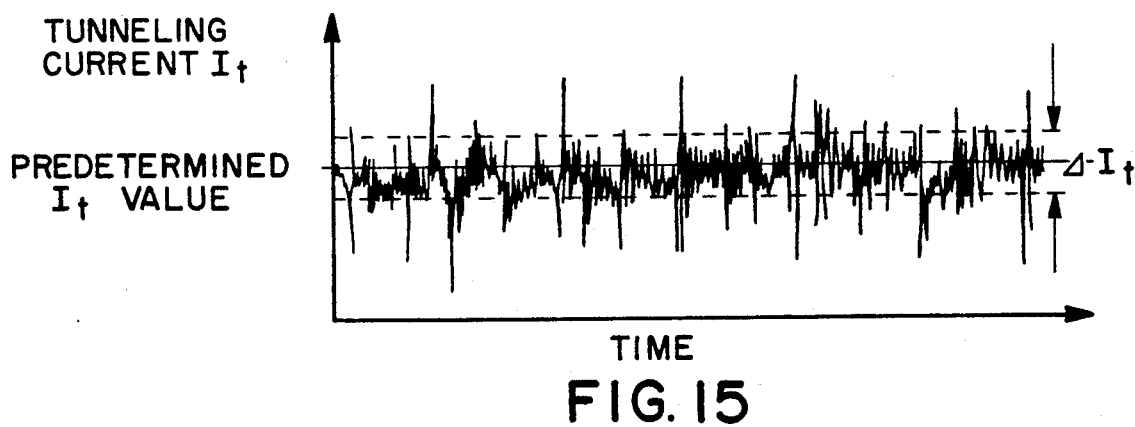
FIG. 15 is a chart showing the definition of the average amplitude fluctuation $\Delta I_t$ of tunneling currents.
Figure 16:
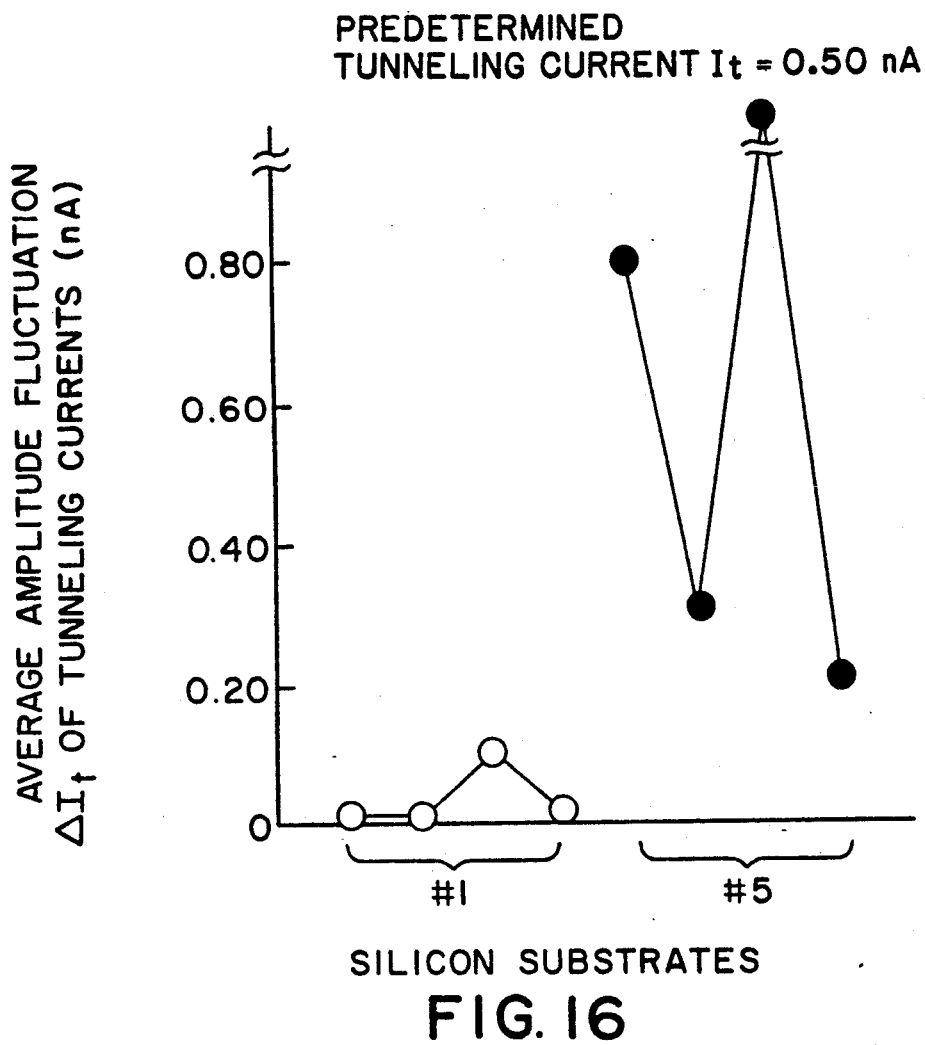
FIG. 16 is a graph showing the relationship between the average amplitude fluctuation $\Delta I_t$ of tunneling currents and the position of the silicon substrates.

FIG. 15 shows the definition of the average amplitude fluctuation $\Delta I_t$ of tunneling currents. FIG. 16 shows the average amplitude fluctuation $\Delta I_t$ with respect to the two kinds of substrates within one lot, the substrates (marked by "●") from which $V_{th}$ fluctuations were observed, and the normal substrates (marked by "o") from which no fluctuations were observed. The observation of $V_{th}$ fluctuations were based on the measurements of electrical characteristics with respect to the samples of an actual device structure including transistors.

In the normal substrates, $\Delta I_t$ was small and the tunneling current was found to be steadily controlled to the predetermined value. On the other hand, in the substrate from which $V_{th}$ fluctuations were observed, $\Delta I_t$ was generally large, that is, the tunneling current was found to be unstable. This means that for same reason as stated in the foregoing Example 1, an insulating impurity film was present on the surface of the silicon substrate 32 just below the gate electrode 33 of the lot from which $V_{th}$ fluctuations were observed.

Thus, according to the method of this invention, it is possible to detect impurity films with high sensitivity, even if the presence of these impurity films is under the lower detection limit of SIMS analysis.

EXAMPLE 5

As large-scale integrated circuits (LSIs) become more and more minute, there arise demands for minute contact holes, in addition to the demands for fine structures at the interface between the gate oxide and the substrate, as mentioned in the foregoing Example 4. As contact holes to be formed become more minute, as a matter of course the contact resistance will become greater. Accordingly, efforts have been directed toward the reduction of such resistance.

Figure 17:
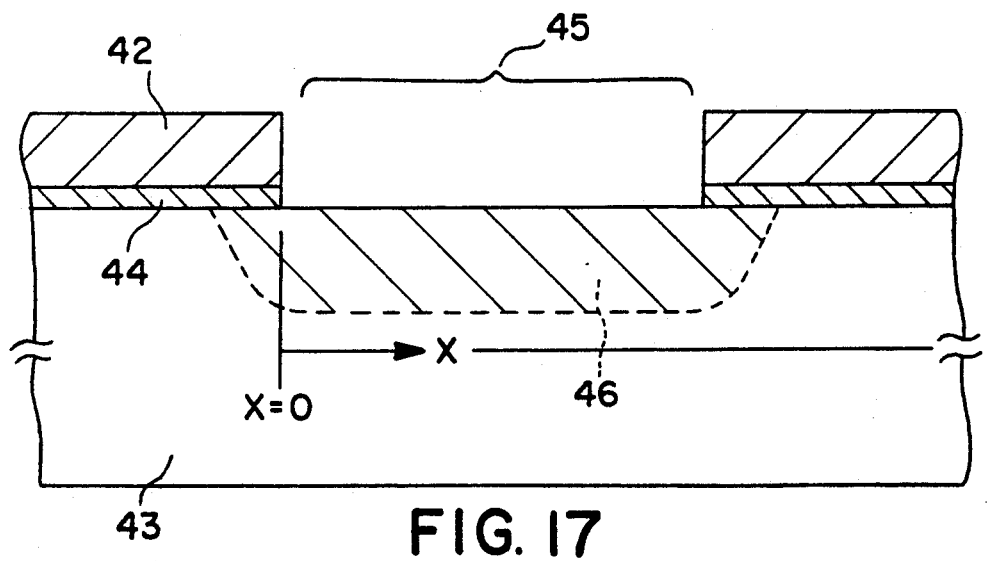
FIG. 17 is a sectional view showing an actual device structure of the contact hole portion of a metal-oxide-semiconductor large-scale integrated circuit (MOS LSI).
Figure 18:
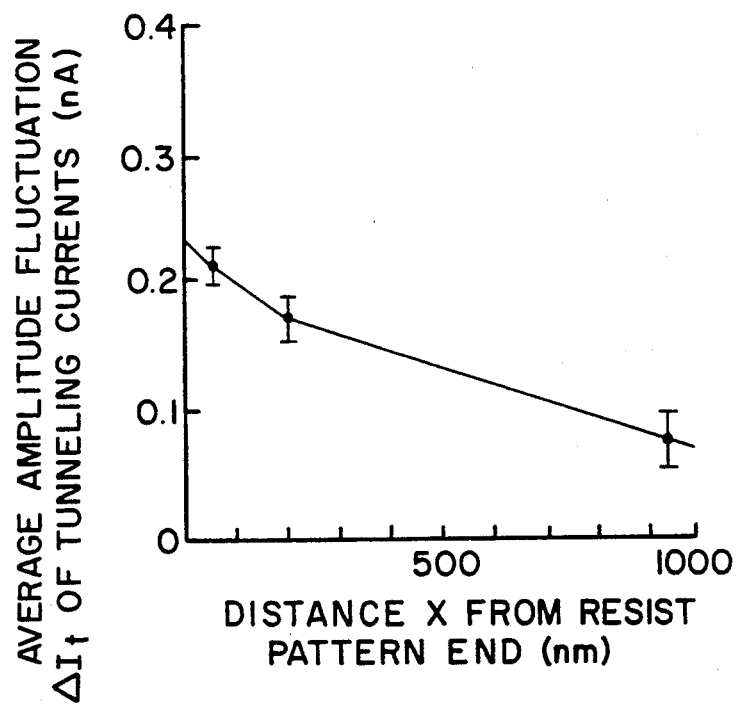
FIG. 18 is a graph showing the relationship between the average amplitude fluctuation $\Delta I_t$ of tunneling currents and the distance from the end of a resist pattern during the measurement of STM images.
Figure 19:
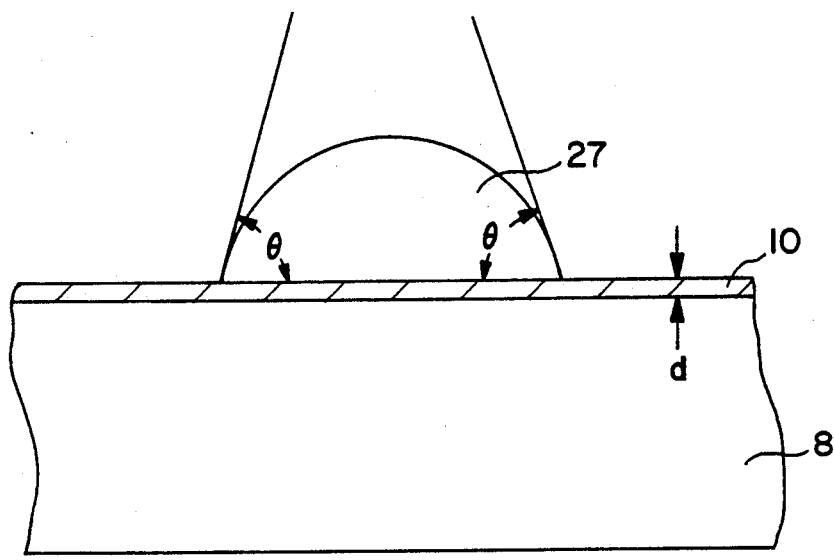
FIG. 19 is a sectional view showing a water droplet which is placed on the residual oxide film formed on the silicon substrate in the water repellency method as a conventional technique.
Figure 20:
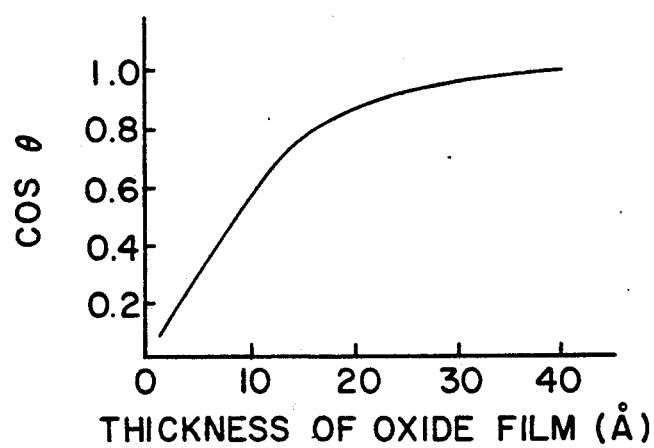
FIG. 20 is a graph showing the relationship between the cosine of the contact angle and the thickness of the residual oxide film.

FIG. 17 shows a cross section of a contact hole area of LSIs. FIG. 18 shows the fluctuations of tunneling current (with the predetermined value of 0.50 nA) as observed when the contact hole area was scanned with the STM means (scan area $500 \times 500$ Å$^2$ and scan time 30 seconds), or the mean unstable value measurements as determined with the distance x from the end of a resist pattern as a parameter. The average amplitudes $\Delta I_t$ of tunneling currents shown in FIG. 18 were measured as follows:

First, with the use of a patterned resist 42 (1500 nm thick) as a mask, a thermal oxide film 44 (600 nm thick) formed on a silicon substrate 43 was etched by a reactive ion etching technique to form a 2 mm$^2$ contact hole 45 on the portion of the silicon substrate 43 in which a diffusion region 46 had been formed. The contact hole area was scanned with the STM means at three measuring points, 50 μm, 200 μm, and 1 mm distant from the end of the resist pattern 42, or the end of the contact hole 45. The results of the measurements are shown in FIG. 18 in terms of average amplitude values $\Delta I_t$ of tunneling currents. The definition of $\Delta I_t$ is the same as that given in Example 4.

As can be seen from FIG. 18, although the tunneling current fluctuations in the proximity of the resist pattern end are large, such fluctuations become smaller in the direction away from the resist pattern end, and the improved stability of tunneling currents is finally obtained. This means that for the same reason as stated in the foregoing Example 1, an insulating impurity film is present on the surface of the silicon substrate 43 in the proximity of the resist pattern end and the density of the impurity film is reduced in the direction away from the resist pattern end until the improved conductivity is obtained.

The measurement results mentioned above are reproducible, and accordingly, it is considered that there exists an electric resistance profile corresponding to the quantity distribution of insulating impurity films. Since the resist 42 is composed of an organic material, trace amounts of constituent elements such as carbon (C) and fluorine (F) will be incorporated as impurities into the diffused region 46 through a plasma process during the reactive ion etching. For this reason, when a wiring material such as aluminum (Al) is placed in the contact hole 45 to thereby form a contact, there will result increased contact resistance. Therefore, it can be understood that as the contact hole 45 becomes more minute, the contact resistance will become greater.

Thus, in this example, no insulating impurity films were intentionally formed as in the foregoing Example 3, therefore, the quantity of such impurity films was quite negligible. In addition, the impurity films were present in such a geometrically complicated location as the resist pattern end. Therefore, it is impossible to detect the presence of the impurity films by conventional analytical means such as secondary ion mass spectrometer and Rutherford back scattering spectrometer. It was also impossible to identify the causes of the increased contact resistance by such conventional analytical means. In light of these facts, the method of this invention which can determine the presence of insulating films with extremely high sensitivity is very useful.

It is understood that various other modifications will be apparent to and can readily be made by those skilled in the art without departing from the scope and spirit of this invention. Accordingly, it is not intended that the scope of the claims appended hereto be limited to the description as set forth herein, bet rather that the claims be construed as encompassing all the features of patentable novelty that reside in the present invention, including all features that would be treated as equivalents thereof by those skilled in the art to which this invention pertains.

What is claimed is:

1. A method for determining the presence of an insulating film on the surface of an electrically conductive material as a specimen, comprising the steps of:

bringing an electrically conductive probe and said electrically conductive material sufficiently close to that electron clouds smearing out around surface atoms included in said electrically conductive probe and electron clouds smearing out around surface atoms included in said electrically conductive material are connected together;

applying a voltage between the probe and the surface of said electrically conductive material sufficient to establish a tunneling current; and detecting and amplifying said tunneling current which flows through said probe, while controlling the distance between the probe and the surface of the electrically conductive material to ensure that said tunneling current is substantially constant.

2. A method for determining the presence of an insulating film on the surface of an electrically conductive material as a specimen, comprising the steps of:

bringing an electrically conductive probe into contact with the surface of said specimen;

applying a voltage between the probe and the surface of said specimen; and detecting and amplifying a tunneling current which flows through said probe, while controlling the distance between the probe and the surface of the specimen to ensure a substantially constant tunneling current.

3. A method according to claim 2, wherein the presence of an insulating film on the bottom surface of a contact hole which is formed on a dry-etched substrate of semiconductor devices is determined, thereby obtaining any specific factor which causes an increase in the current through said contact hole.

* * * * *

UNITED STATES PATENT AND TRADEMARK OFFICE
CERTIFICATE OF CORRECTION

PATENT NO. : 5,182,452

DATED : January 26, 1993

INVENTOR(S) : Masaaki Niwa and Shozo Okada

It is certified that error appears in the above-indentified patent and that said Letters Patent is hereby corrected as shown below:

Column 12, line 49, before "that", delete "to"
and insert therefor --so--.

Signed and Sealed this

Twenty-third Day of November, 1993

Attest:

BRUCE LEHMAN

*Attesting Officer*  *Commissioner of Patents and Trademarks*